(12) United States Patent    (10) Patent No.: US 8,671,553 B1
Raisch    (45) Date of Patent: Mar. 18, 2014

(54) METHOD FOR PROTECTING A TOUCH-SCREEN DISPLAY

(71) Applicant: Netanel Raisch, Psagot (IL)

(72) Inventor: Netanel Raisch, Psagot (IL)

( * ) Notice: Subject to any disclaimer, the term of this patent is extended or adjusted under 35 U.S.C. 154(b) by 0 days.

(21) Appl. No.: 13/622,374

(22) Filed: Sep. 19, 2012

(51) Int. Cl.
*H01F 7/06* (2006.01)

(52) U.S. Cl.
USPC ............ 29/602.1; 29/831; 29/835; 29/846; 29/854; 345/173; 379/433.12; 379/433.13; 445/24; 455/553.1; 455/556.2; 455/575.3

(58) Field of Classification Search
USPC ............ 29/592.1, 602.1, 831, 835, 846, 854, 29/871, 872, 873; 445/24; 345/173; 455/553.1, 556.2, 575.3; 379/433.12, 379/433.13
See application file for complete search history.

(56) References Cited

U.S. PATENT DOCUMENTS

| | | | | |
|---|---|---|---|---|
| 6,542,721 B2* | 4/2003 | Boesen | ............ | 455/553.1 |
| 6,892,082 B2* | 5/2005 | Boesen | ............ | 455/575.3 |
| 2002/0154099 A1* | 10/2002 | Oh | ............ | 345/173 |
| 2005/0073506 A1* | 4/2005 | Durso | ............ | 345/173 |
| 2011/0310459 A1* | 12/2011 | Gates et al. | ............ | 359/296 |

FOREIGN PATENT DOCUMENTS

GB    2457610 A * 8/2009

\* cited by examiner

*Primary Examiner* — Paul D Kim

(57) ABSTRACT

The invention discloses methods for transferring a tactile signal through an inert piece of material. In some embodiments, clear, impact resistant covers are employed with devices including touch-sensitive screens. The instant invention, in some embodiments, describes a method for employing a plurality of magnets to allow a user to input information on a touch-sensitive screen through the inert cover. Contact of a magnet pair above the cover may allow for a signal to be delivered to the touch-sensitive display via a second magnet pair that includes a stylus adapted to activate the surface of the display.

4 Claims, 9 Drawing Sheets

| providing an optically clear solid element whose dimensions are similar to those of the display and whose thickness is selected to prevent damage to the display |  | disposing magnet pairs on either side of the solid element, wherein the magnet pairs are disposed opposite one another and wherein physical contact with one magnet of a first magnet pair causes magnetic repulsion of a first magnet opposite it in the second magnet pair on the other side of the solid element |  | associating a stylus to the first magnet of the second magnet pair, wherein the stylus is disposed away from the solid element |  | securing the solid element with the magnets and stylus onto the display, wherein the stylus is in non-contact proximity to the display |

FIG. 7

METHOD FOR PROTECTING A TOUCH-SCREEN DISPLAY

FIELD AND BACKGROUND OF THE INVENTION

The present invention, in some embodiments thereof, relates to methods and devices for allowing the transfer of a tactile signal through a solid, non-conducting surface. The instant invention, in some embodiments, allows for a user to access a touch-screen display through a rigid, otherwise electrically unresponsive cover.

One of the greatest revolutions in the electronics sphere has been devices with touch-sensitive displays. "Smart" phones, tablet computers, GPS devices and other advanced devices allow for a touch-based interface between a user and the device. A typical smart phone allows one to access Internet, email, phone, pictures, music, applications, and a host of other features through finger-based actions on a touch-sensitive screen.

One of the challenges of touch-sensitive screens has been their relative fragility. A veritable cottage industry exists for replacing and fixing cracked screens associated with phones and tablet computers. While very solid and sophisticated cases exist for the body of modern portable computerized devices with touch screens ("computerized devices"), the touch-sensitive screen generally remains available or is only nominally covered so as to allow user access for answering and making calls and otherwise accessing the device's wide functionality. Placing a thick solid piece over the touch-sensitive area would make the phone unusable until the solid piece was removed for display access.

The current state of affairs leaves a user with a choice. If the screen is covered with a thick cover, then the display is safe from damage but the computerized devices are for all purposes unusable. If the screen is available for user access, then the risk exists for damage to the screen from falls, impacts, children misuse or other accidents. As of today, there is little way to both protect a touch-sensitive (glass, generally) screen and still allow for unfettered access to the wide range of smart device functions enumerated above.

U.S. Pat. No. 8,044,942 to Leonard, et al teaches a touch screen protector for a hand held electronic device having a front face that includes a touch screen portion and an outer perimeter. The touch screen protector of the invention comprises a plastic film having front and back sides, an outer perimeter that corresponds to that of the device, and a transparent window; and a spacer provided along the outer perimeter of the plastic film surrounding the transparent window, having a thickness sufficient to space the plastic film near but not in contact with the touch screen portion, and an exposed adhesive for removably mounting the protector upon the outer perimeter of the front face to form an enclosed air space between the transparent window of the plastic film, the spacer and the touch screen portion of the device.

U.S. patent application Ser. No. 12/977,919 to Karpfinger describes a user-configurable, tactile interface system that includes mechanical buttons with several mounting options, and several methods to interface with touch-sensing devices. A user can activate a touch on a touch sensing device by pressing a physical pad, which may be textured, or raised.

U.S. Pat. No. 7,495,895 to Carnevali. Describes a protective cover for a device having a touch-sensitive screen, the cover being a substantially optically transparent flexible protective cover formed of a unitary combination of a mask portion substantially surrounded with a plurality of integrally interconnected curtain portions extending therefrom and forming therebetween a plurality of interconnected lip portions, the mask, curtain and lip portions forming a cavity therebetween with the lip portions surrounding a mouth opening thereinto; and the mask portion further having a relatively thicker frame portion surrounding a relatively thinner recessed integral window portion formed of a flexible membrane that is positioned over the device's touch screen.

U.S. patent application Ser. No. 12/949,177 to Park, teaches an LCD screen protector for LCD devices, which is made of thin, tempered glass or reinforced plastics with great strength, strongly adhered on the surface of an LCD device to protect the LCD device from external shocks. The LCD screen protector includes a protective plate made of tempered glass or reinforced plastics with good anti-bendability and a ring-shaped band with elasticity protrudingly formed on an outer circumference of the protective plate.

U.S. Pat. No. 6,152,550 to Yamaguchi describes a protective sheet mount structure for a display which may be employed in electronic cash registers. The structure includes a frame mount formed on a frame of a display around an opening through which a display screen is exposed, a protective sheet covering the display screen, and a sheet mount frame fitted in the frame mount detachably to retain the protective sheet on the frame of the display.

U.S. Pat. No. 6,660,389 to Junkang teaches information display protectors for display devices having an information display area, comprising a stack of flexible substantially transparent sheets, the sheets having on one side thereof an adhesive layer and having on the other side thereof a hardcoat layer comprising inorganic oxide particles dispersed in a binder matrix and a low surface energy fluorinated compound, the stack being cut so that the sheets will fit the information display area. The low surface energy fluorinated compound can be part of the hardcoat layer or can be a separate layer atop the hardcoat layer. The protectors have very good scratch, smudge and glare resistance. The stack of protectors can be stored, for example, on a personal digital assistant or its cover or case.

The prior art generally describes display covers that offer display access but no serious display protection from falls, impacts and other potential damage.

SUMMARY OF THE INVENTION

It is therefore a purpose of the present invention, in some embodiments, to describe methods and devices for allowing a user to make full use of a touch-screen display through an impact-resistant cover.

The invention includes a device for allowing transmission of a tactile signal through a rigid material, including: a rigid, generally flat element; a first magnet pair disposed on an outer side of the element, wherein the magnets of the first magnet pair are of positive and negative polarity facing the outer side of the element and the magnet with positive polarity is disposed slightly above the element; and, a second magnet pair disposed on a inner side of the element physically opposite the first magnet pair, wherein the magnets of the second magnet pair are of positive polarity facing the inner side of the element.

In one aspect of the device, the first magnet pair and the second magnet pair are free to move over the area of the element.

In another aspect of the device, the first magnet pair is realized as an electromagnet.

In another aspect of the device, the second magnet pair is realized as an electromagnet.

In another aspect of the device, one magnet of the magnet pairs is an electromagnet.

In another aspect of the device, the first magnet pair has a place for easy positioning of a user's finger.

In another aspect of the device, the element is optically clear.

In another aspect of the device, the magnets of the first magnet pair are attached to each other with a non-conducting material.

In another aspect of the device, the magnets of the second magnet pair are attached to each other with a non-conducting material.

In another aspect of the device, the device is used as a protective cover for a touch-sensitive screen.

In another aspect of the device, the touch-sensitive screen is associated with a cellular phone, tablet computer, computer screen, watch or handheld computing device.

In another aspect of the device, the element has a clip or contact elements associated with the second side to assist in association of the device with the touch-sensitive screen.

In another aspect of the device, there is additionally a stylus associated with a magnet of the second magnet pair, wherein the stylus sits on a side of the first magnet away from the element and is adapted to activate a region of the touch-sensitive screen when in contact with the screen.

In another aspect of the device, physical contact with the positive polarity magnet of the first magnet pair causes the stylus to contact the screen.

In another aspect of the device, the element is realized from clear plastic, glass, Plexiglass, or composite material.

In another aspect of the device, there is additionally an anti-friction coating to ease magnet movement over the surfaces of the element.

The invention additionally includes a device for protecting a touch-sensitive display screen, including: a generally flat element of a predetermined thickness; a first magnet pair disposed on an outer side of the element, wherein the magnets of the first magnet pair are of positive and negative polarity facing the outer side of the element and the magnet with positive polarity is disposed slightly above the element; a second magnet pair disposed on a inner side of the element physically opposite the first magnet pair, wherein the magnets of the second magnet pair are of positive polarity facing the inner side of the element; and, a stylus for activating the display screen, the stylus being associated with one of the magnets of the second magnet pair.

In one aspect of the device, the touch-sensitive display is associated with a cellular phone, tablet computer, computer screen or handheld computing device.

In another aspect of the device, there is additionally an anti-friction coating associated with the magnetic elements.

In another aspect of the device, there are additional magnet pairs.

In another aspect of the device, the magnetic elements are selected for size, material and appearance so as to allow for easy viewing of the display screen.

The invention includes a method for protecting a touch-screen display from physical damage, including: providing an optically clear solid element whose dimensions are similar to those of the display and whose thickness is selected to prevent damage to the display; disposing magnet pairs on either side of the solid element, wherein the magnet pairs are disposed opposite one another and wherein physical contact with one magnet of a first magnet pair causes magnetic repulsion of a first magnet opposite it in the second magnet pair on the other side of the solid element; associating a stylus to the first magnet of the second magnet pair, wherein the stylus is disposed away from the solid element; and, securing the solid element with the magnets and stylus onto the display, wherein the stylus is in non-contact proximity to the display.

In one aspect of the method, there is additionally the step of physically touching the one magnet of the first magnet pair, thus causing the stylus associated with the second magnet pair to be depressed for contact with the display.

In another aspect of the method, the one magnet of the first magnet pair is an electromagnet.

In another aspect of the method, there is additionally an anti-friction coating on the surfaces of the element.

In another aspect of the method, the step of securing of the solid element is reversible.

Unless otherwise defined, all technical and/or scientific terms used herein have the same meaning as commonly understood by one of ordinary skill in the art to which the invention pertains. Magnetic "polarity" may be understood to have its generally accepted meaning in the physical sciences. For reference, it is understood that a positive magnet will attract a negative magnet, while a positive magnet will repel another positive magnet. "Element", "clear element", "protective element", "impact-resistant element", and "impact-resistant cover" generally refer to an optically-clear, solid component of the instant invention that may be placed over a touch-sensitive screen or display and has thickness and other properties to allow visualization of the touch-sensitive screen or display while providing impact and other protections to said screen or display. A "display' or "touch-sensitive screen" according to the present invention may include any stimulus-responsive graphical user interface (touchscreen GUI for example) or the like by which a user may interact or communicate with a computing or similar device via an action of the user. Stimuli for activating a display or screen include but are not limited to touch, voice, light, and sound. A "stylus" for the present invention may be any element that physically contacts or otherwise activates a display or touch-sensitive screen to respond to a user input. Non-contact physical proximity, light, or other means may be used for allowing a stylus to interact with a display or similar interface.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. It is noted that similar elements in various drawings will have the same number, advanced by the appropriate multiple of 100.

In the drawings:

FIG. 7 shows a method associated with the instant invention;

DESCRIPTION OF SPECIFIC EMBODIMENTS OF THE INVENTION

The present invention, in some embodiments thereof, relates to a cover for touch-sensitive screens, wherein the cover provides both strong protective features for the fragile screen, while concomitantly providing full access to the screen and its touch-sensitive functionality.

For purposes of better understanding, some embodiments of the present invention are illustrated in the figures of the drawings.

First Embodiment

Figure 1:
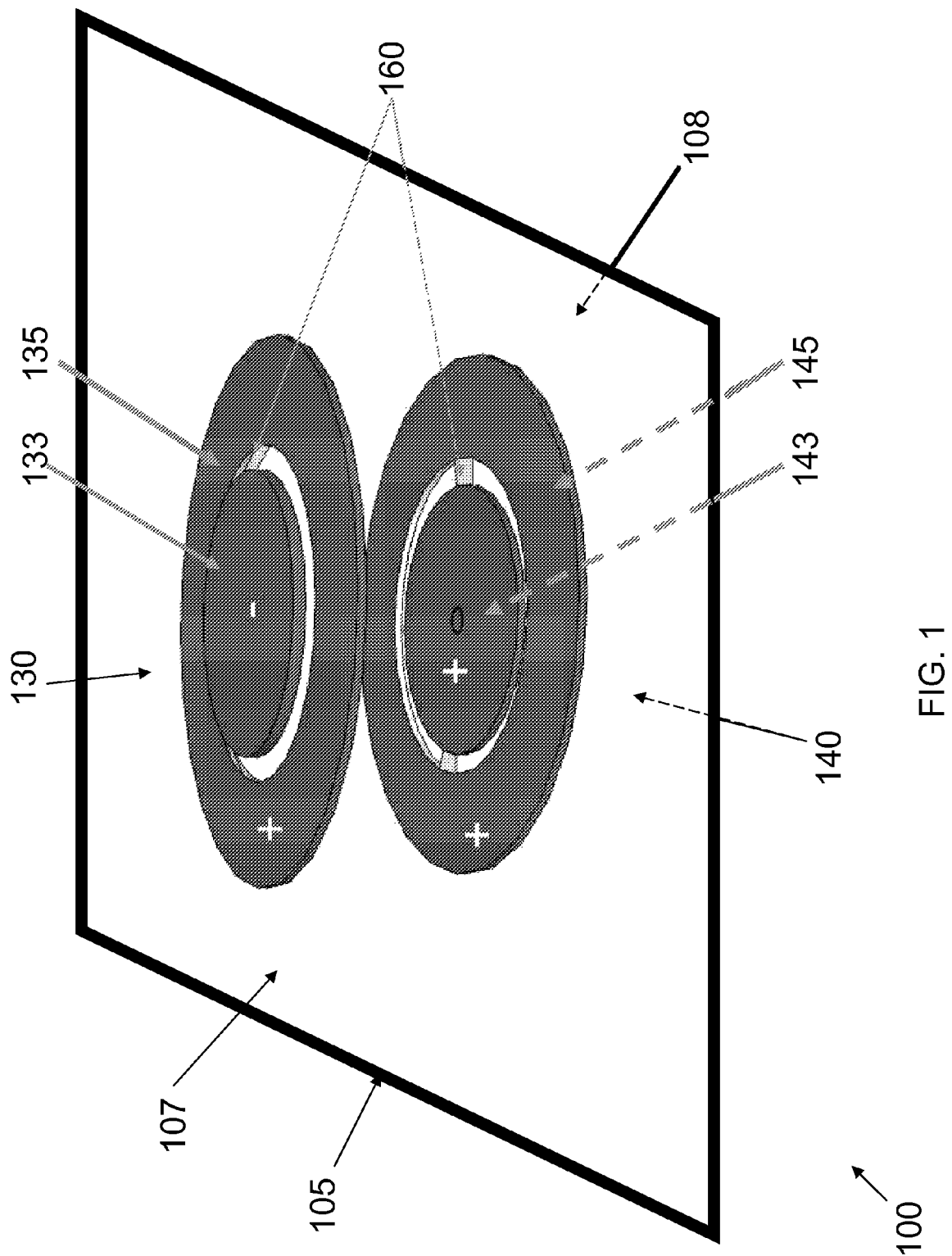
FIG. 1 shows a schematic view of an embodiment of the instant invention.

Attention is turned to FIG. 1 which shows a schematic view of an embodiment of a touch-sensitive screen protector 100. A rigid, generally flat optically clear element 105 has an outer surface 107 and an inner surface 108. The inner surface 108 is generally the side of the element 105 which is closest to a touch-sensitive or similar display (not shown) and furthest from a user (not shown) of a device that includes the aforementioned display. In this embodiment, a first magnet pair 130 is disposed on the outer side 107 of the element 105, while a second magnet pair 140 is disposed on the inner side 108 of the element 105. Each magnet pair 130 & 140 includes at least two magnets: the outer magnet pair 130 includes magnets 133 & 135, while the inner magnet pair 140 includes magnets 143 & 145. The magnets in the drawings are circular magnets, the circle shape being just an option and the magnets may be of any relevant shape, size or composition. In a typical embodiment, magnets 133, 135 & 145 have a positive polarity as measured relative to element 105. Magnet 143 has a negative polarity. The outcome of this arrangement around the element 105 is an attractive arrangement between magnets 133 & 143 due to their respective positive and negative polarities relative one another. As such, magnets 133 & 143 keep the first magnet pair 130 and the second magnet pair 140 securely facing one another around the element 105. The remaining magnets 135 & 145 have identical polarities (+) facing the surfaces of the elements 105. Joining element 160 holds magnets 133 & 135 together; magnets 143 & 145 may include joining elements as well as additional elements such as a spring (not shown) to aid in their combined functionality.

Figure 2:
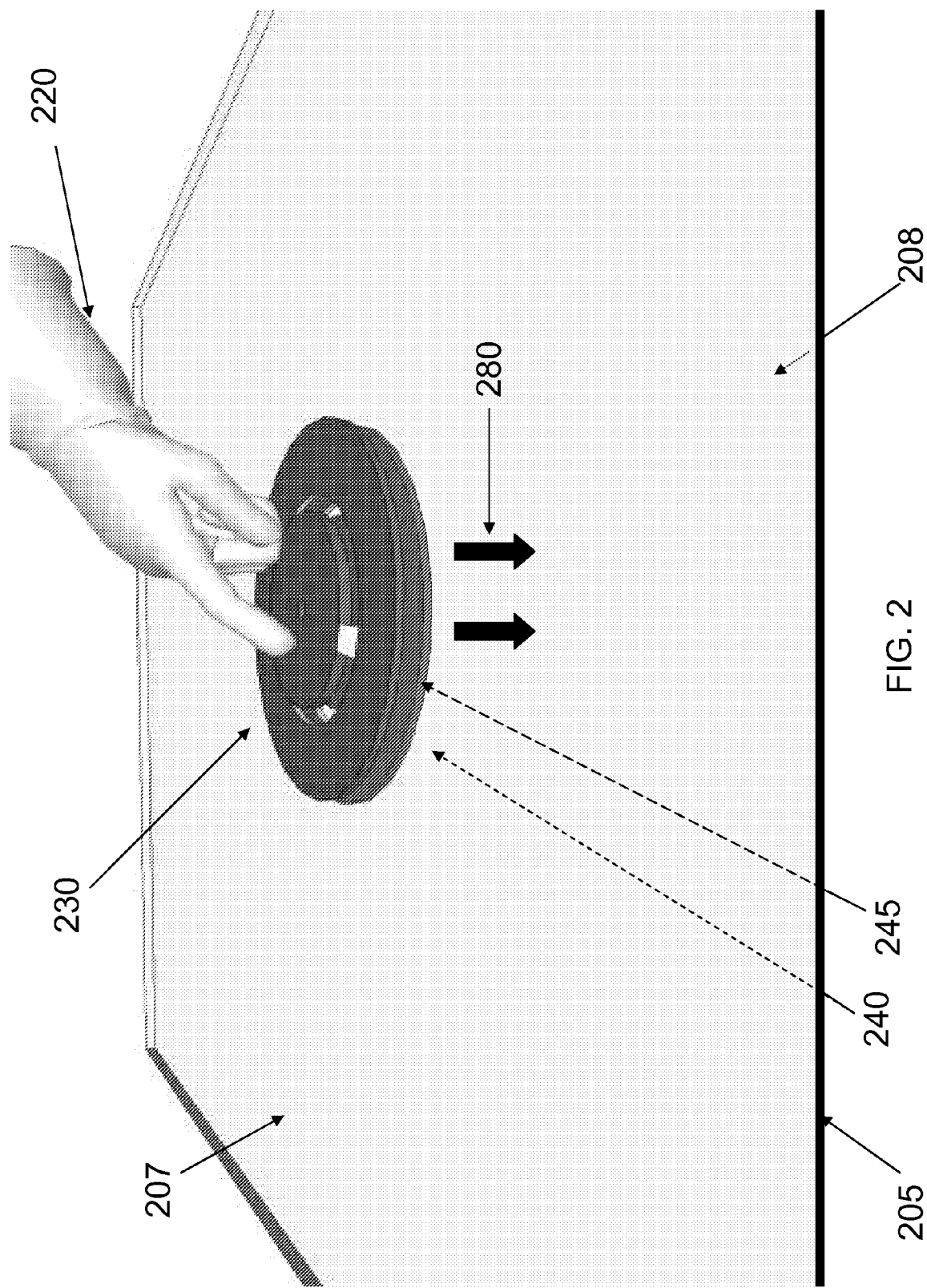
FIG. 2 shows an additional view of the first embodiment of the invention.

Attention is turned to FIG. 2. User 220, in touching the first magnet pair 230 and pushing it towards the outer surface 207 of the protective element 205 causes magnet 245 to be pushed away from the inner surface 208 of protective element 205 due to the magnets 235 & 245 having identical polarity as measured facing the element 205. In this arrangement, a tactile action by user 220 on one side of the element 205, namely depressing magnet pair 230, may lead to a downward displacement 280 of a magnet 245 on the other side of the element 205, though the element 205 may be electrically non-conducting.

Figure 3:
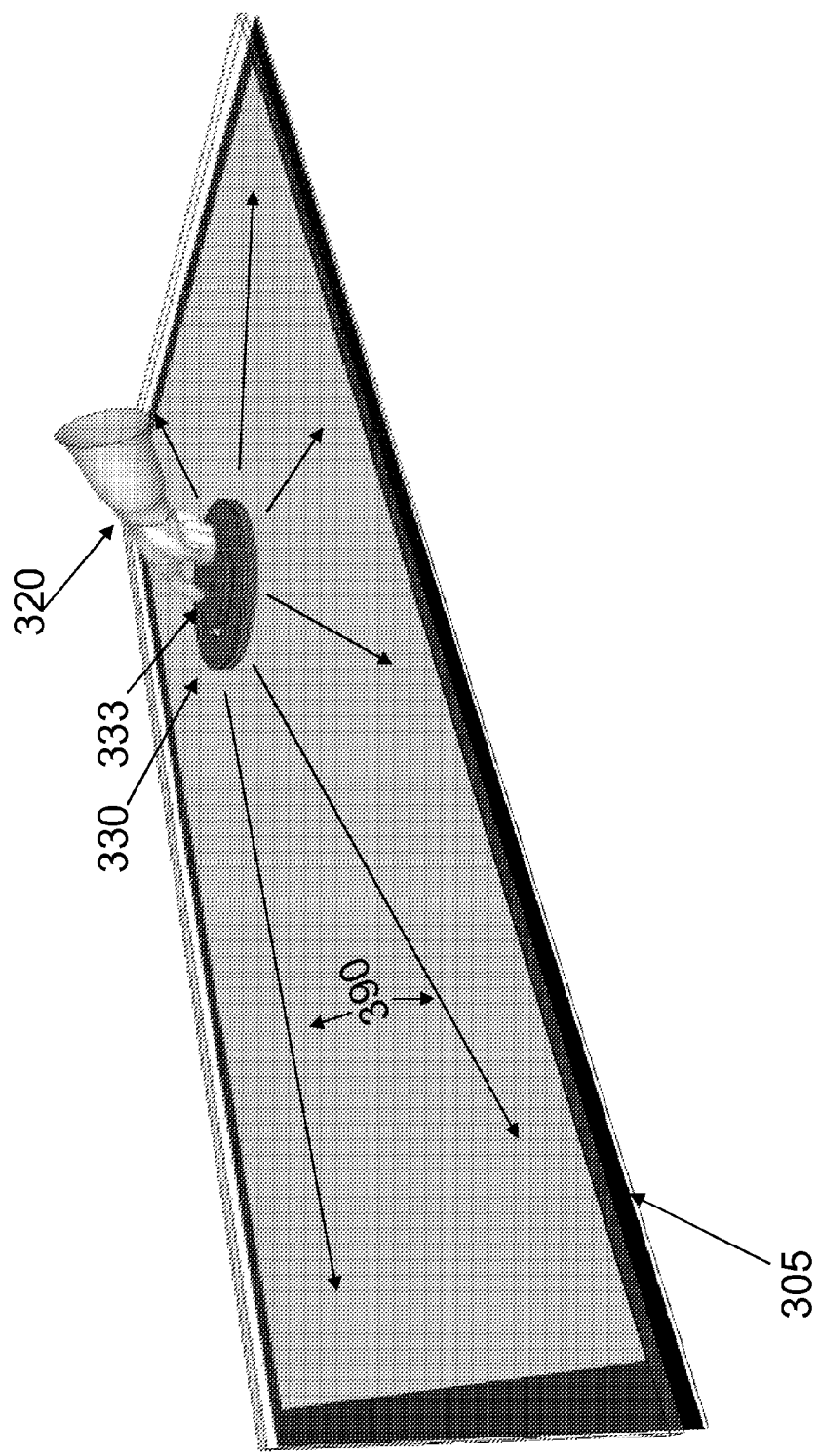
FIG. 3 shows an additional view of the first embodiment of the invention.

Attention is turned to FIG. 3. Magnet pairs may move over the surfaces of the element 305 through user 320 pushing on magnet 333 of the first magnet pair 330. An anti-friction coating (not shown) may be placed on one or both sides of the element 305 to facilitate travel of magnet pairs over the element 305 as suggested by arrows 390. Alternatively, the anti-friction coating may be associated with the magnets themselves. User 320 may push on the magnet 333 involved in holding the magnet pairs to the element 305 when he/she wishes to move the magnet pairs over the element 305. He/she then may depress the other magnet (FIG. 1, 135) so as to cause the opposite magnet 145 to be displaced from the surface 108 of the element, as shown clearly in FIG. 1. Unlike the prior art, the instant embodiment as described in FIG. 3 allows for full access to every area of a touch-screen or similar responsive display.

Figure 4:
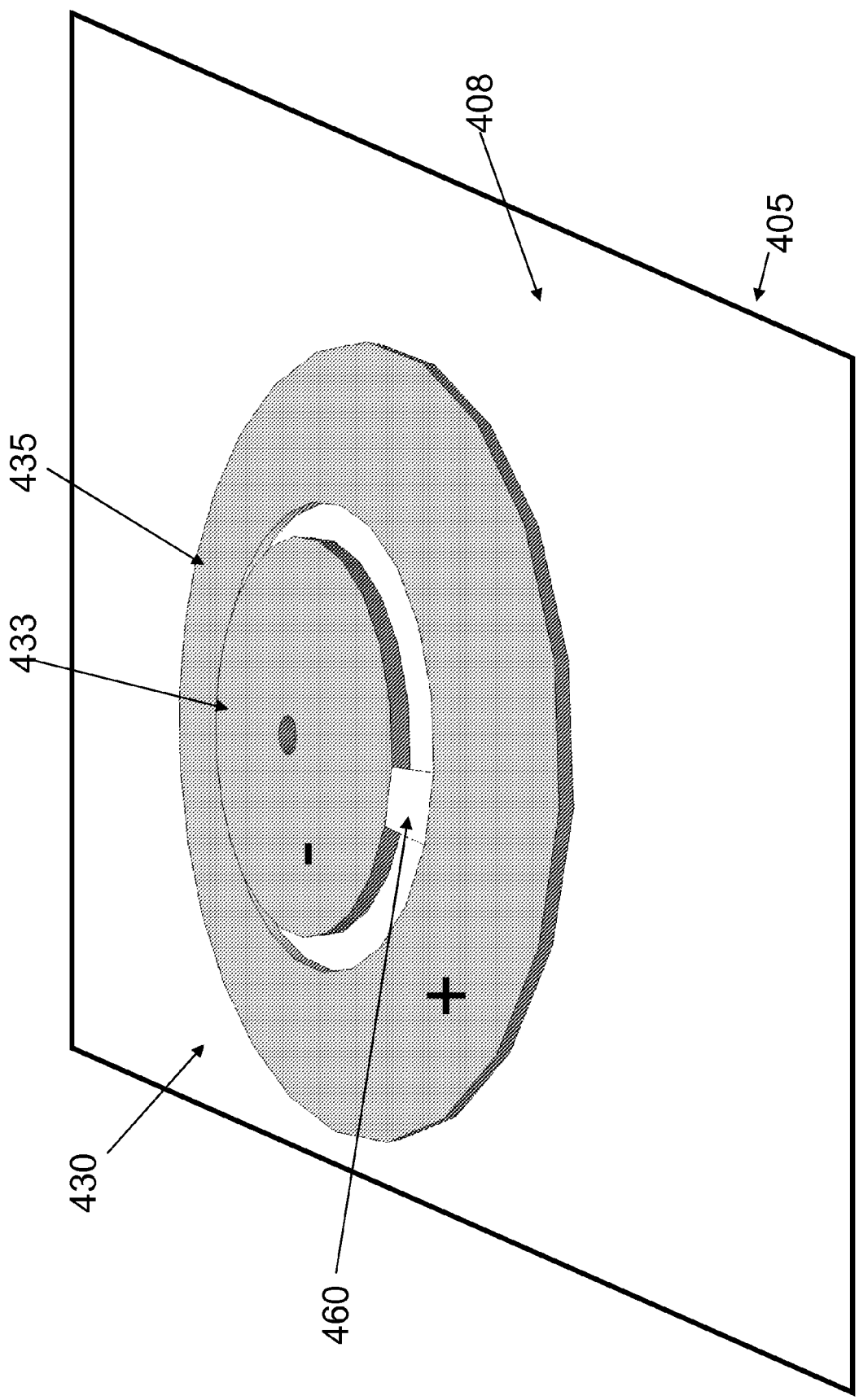
FIG. 4 shows a detailed view of an outer magnet pair.

FIG. 4 shows a close-up of magnet pair 430 which includes attachment magnet 433 and tactile transfer magnet 435. To move the magnet pair, a user (not shown) will generally put his/her finger on the magnet 433, whose polarity is opposite that of the magnet on the other side of the rigid, flat protective element 405. When user wishes to transfer a tactile signal through the element 405, then he/she pushes on magnet 435 which causes the second magnet pair (not shown) or a portion thereof to be displaced from the inner surface of the protective element 405 due to magnetic repulsion. The system thus allows for moving the magnets over the element 405 and for transferring tactile information at a predetermined position of the user's choosing. A plurality of joining elements 460 hold magnets 433 & 435 together; the same elements 460 are used in the second magnet pair. The + and − polarities shown on magnets 433 & 435 are relative to the outer surface 408 of element 405.

Second Embodiment'

Figure 5:
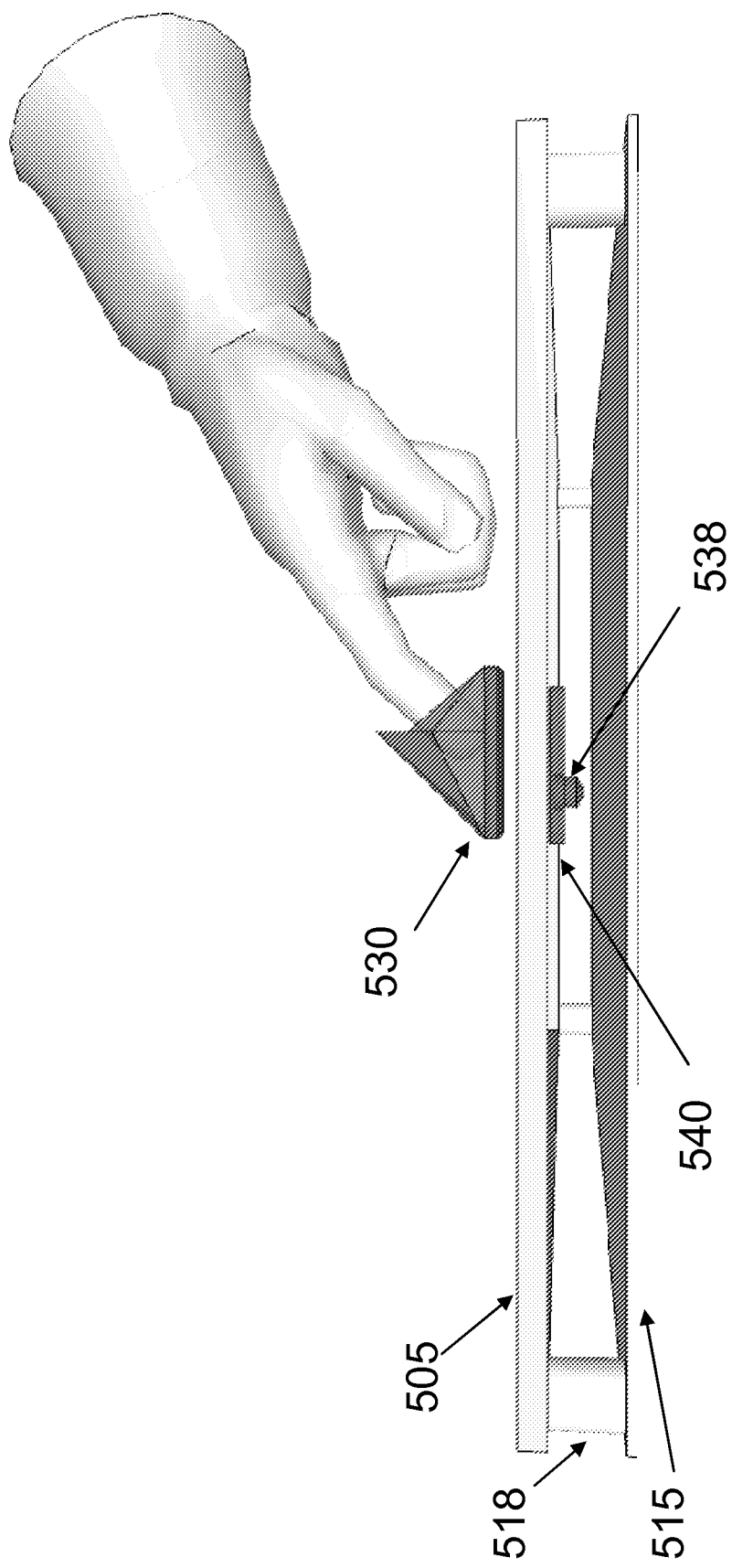
FIG. 5 shows a second embodiment of the instant invention prior to user contact.

Attention is now turned to FIG. 5 which shows a schematic view of an embodiment of the instant invention. A touch-sensitive display 515 associated with a cellular phone, tablet computer, watch, handheld electronic device or the like is covered with an element 505 which is impact resistant. Holding features 518 may be used to fasten the element to the display 515 so as to leave space 580 between element 505 and display 515. Such features 518 include but are not limited to clips and contact elements. Contact elements may be any features that aid in attaching the element 505 proximate the surface of the display 515. The impact resistant element 505 has an upper magnet pair 530 and a lower magnet pair 540. The upper magnet pair 530 is shown slightly displaced above the element, though—as described in the previous embodiment—only one of the two magnets of the magnet pair 530 is generally displaced from the element 505 surface. A stylus 538 capable of activating the touch-sensitive display 515 is disposed on the side of the lower magnet pair 540 facing the touch-sensitive display 515. The stylus 538 is selected for properties which allow for activation of the touch-sensitive display 515 specifically when stylus 538 and display 515 are in physical contact or in a proximate relationship that allows for display 515 activation. FIG. 5 shows the situation when a user (not shown) does not wish to click or otherwise interact with the touch-sensitive display 515: the stylus 538 is disposed above, but not in contact with, the display 515 and thus does not in any way cause the display to register activity. In this arrangement, user may move the magnet pairs 530 & 540 with the stylus 538 to a position over any part of the display 515 as previously described in the previous embodiment. It is understood that in some embodiments, the stylus does not need to actually physically contact the display 515 in order to cause the display 515 to respond to user action. Approach of stylus 538 to a closer non-contact position may be enough to allow the display to react to a user's action.

Figure 6:
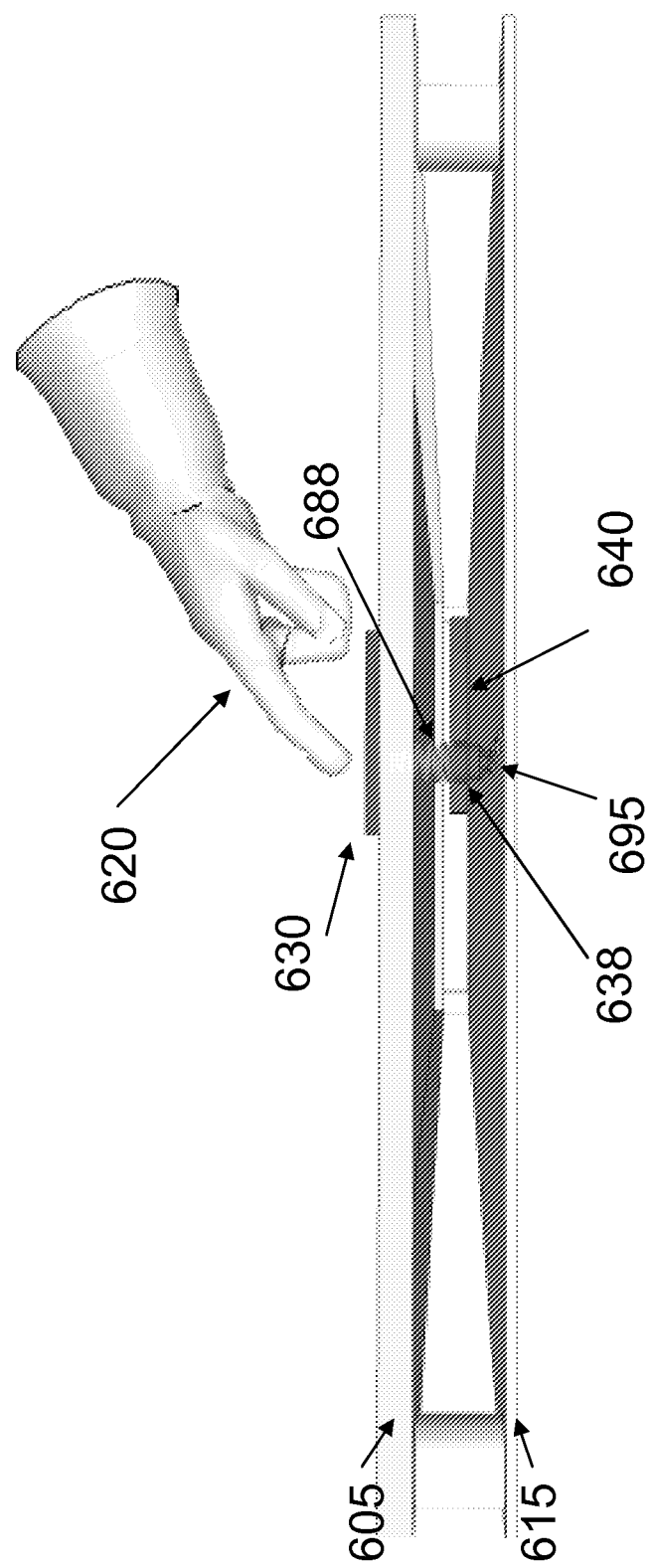
FIG. 6 shows the second embodiment of the invention after user contact.

Attention is now turned to FIG. 6. User 620 pushes on upper magnet pair 630 or the positive magnet (not shown for clarity) of the upper magnet pair 630. This push of the magnet pair 630 causes the lower magnet pair 640 or a portion thereof to be displaced away from the surface of the element 605, thus causing stylus 638 to physically contact and activate the display 615. The contact of stylus 638 with display 615 leads to an input 695 in the display 615. By removing his/her finger, user 620 thus causes the stylus 638 to move away from the display 615 surface and return to the state shown in FIG. 5.

As described in the present embodiment, one may use a solid, impact-resistant element 505 to allow for transfer of tactile information from a user (FIG. 6, 620) to a touch-sensitive display 615. The instant invention thus allows for maximum protection of a generally fragile display 615 with full access to said display's functional capabilities. In its default position, the stylus 638 does not touch the display 615, whether the magnet pairs 630 & 640 are moving over the surface of the element 605 or staying in place. Only with an active push or the like from user 620 does stylus 638 contact, come closer to or otherwise cause a response in the display 615, allowing for an input 695 to be registered by the device associated with said display 615. It is noted that a spring 688 or other attachment component (not shown) may be attached between the element 605 and the lower magnet pair 640 to allow for movement of the magnet pair 640 and the associated stylus 638 away from the element 605 and back again after removal of user 620 input.

Third Embodiment

Attention is now turned to FIG. 7 which describes a method for protecting a touch-screen display from physical damage, including: providing an optically clear solid element whose dimensions are similar to those of the display and whose thickness is selected to prevent damage to the display; disposing magnet pairs on either side of the solid element, wherein the magnet pairs are disposed opposite one another and wherein physical contact with one magnet of a first magnet pair causes magnetic repulsion of a first magnet opposite it in the second magnet pair on the other side of the solid element; associating a stylus to the first magnet of the second magnet pair, wherein the stylus is disposed away from the solid element; and, securing the solid element with the magnets and stylus onto the display, wherein the stylus is in non-contact proximity to the display. The method herewith described allows a user to interact with a touch-sensitive display through the medium of a optically-clear, thick cover. As described, magnet pairs are placed opposite one another, with a touch-sensitive display stylus being disposed on the inner magnet pair, facing towards but not contacting the touch-sensitive display. A user may move the magnet pair anywhere over the touch-sensitive display, as the cover is selected to have a surface approximately the same size as the reactive area of the touch-sensitive display. When a user wishes to enter data, he/she simply pushes on a position of the upper magnet pair, thus displacing the lower magnet pair and its associated stylus, the stylus contacting the display and entering a signal into the device associated with the display. A friction-reducing coating associated with the magnet pairs and/or the cover may aid in easy movement of the stylus from position to position over the display.

EXAMPLE

A smart phone with a five inch touch-sensitive screen is provided. A piece of clear Plexiglass having a thickness of four millimeters has magnet pairs disposed on either side, wherein said magnet pairs are opposite one another, with a stylus associated with the inner magnet pair. The Plexiglass is fastened to the smart phone, so that the stylus is in a non-contact proximity (generally less than 2 millimeters) away from the touch-sensitive screen of the smart phone. The upper magnet pair is accessible to user touch, and user may either contact the upper magnet to move it and the associated lower magnet to any position on the Plexiglass cover. Alternatively, at a predetermined and desired position, user may press the upper magnet pair to cause, through magnetic repulsion, the stylus to be depressed in order to activate the touch-sensitive screen of the smart phone, thus causing the smart phone to register a contact similar to that of a human finger. Thus, should a user wish to dial the phone number 312-3124, he/she, would sequentially move the magnet pairs over the numbers (3 then 1, then 2, etc.) and when the magnet pair is over the correct number, he/she would push the appropriate magnet of the upper magnet pair to cause the stylus attached to the lower magnet pair to contact the number on the touch sensitive display immediately under the magnet pairs. Magnet pairs may be miniaturized, be made of clear material, or otherwise manipulated or treated to as to allow user maximum visual access to the touch-sensitive screen of the smart phone.

Figure 8:
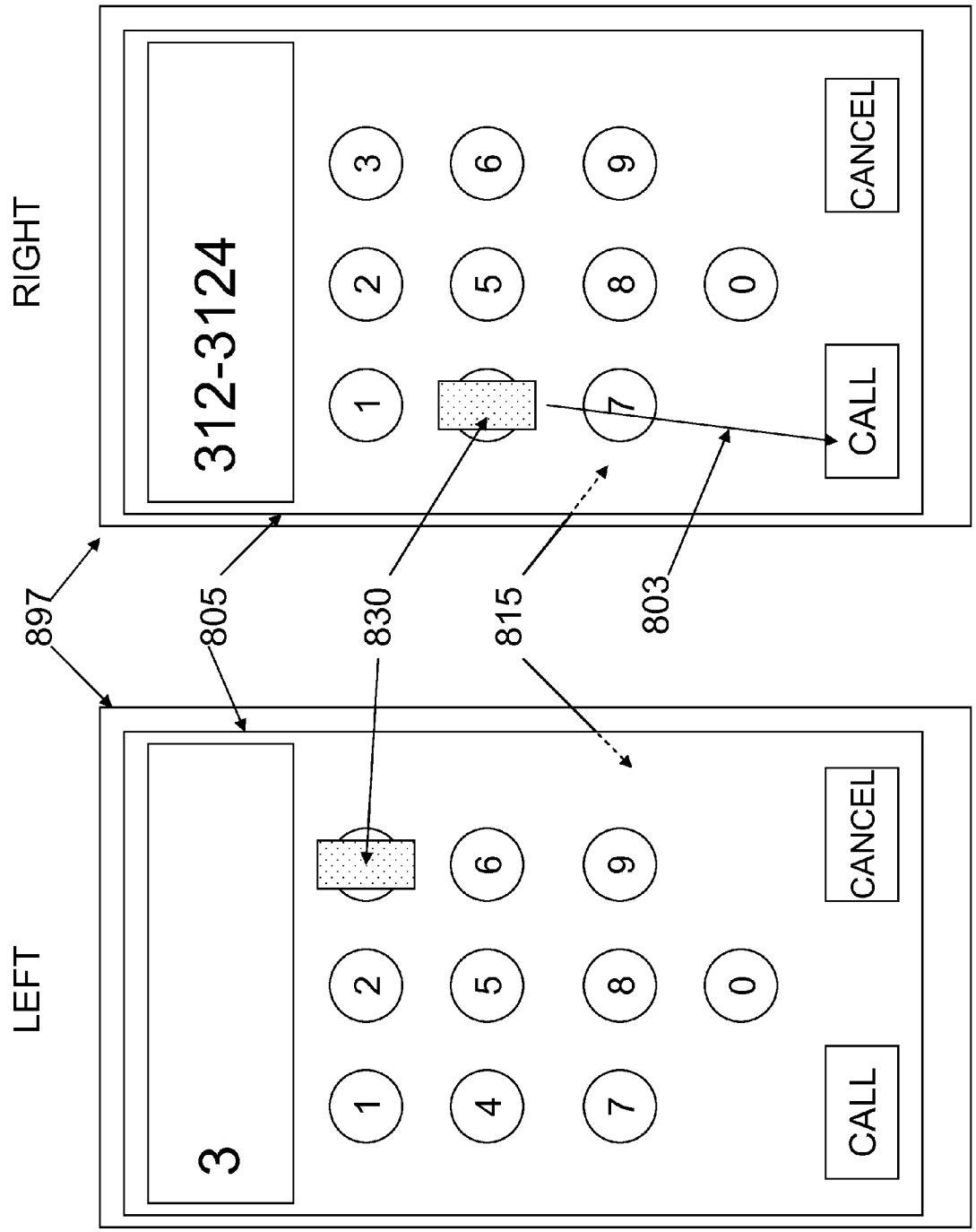
FIG. 8 shows a schematic view of an embodiment of the instant invention associated with an example; and, FIG. 9 shows a schematic view of an embodiment of the instant invention integrated into a cell phone case.

Attention is turned to FIG. 8, which shows a smart phone 897 over whose touch sensitive screen 815 is placed an impact-resistant cover 805. The upper magnet pair 830 is visible from this top view and rests over the lower magnet pair with stylus (blocked from view). On the left, the upper magnet 830 is shown over the number three immediately after a user (not shown) has depressed the "3" button on the screen by pressing on the upper magnet pair 830. The number "3" appears on the screen. In the figure on the right, the upper magnet pair 830 is located over the number "4" of the touch-sensitive display 815 after user has finished entering the final digit of the telephone number listed above. User may now move the magnet pairs to the "Call" button as suggested by arrow 803. When user pushes on the upper magnet pair 830 over the "Call" button, the smart phone will begin dialing the entered number and placing the desired call.

Fourth Embodiment

Figure 9:
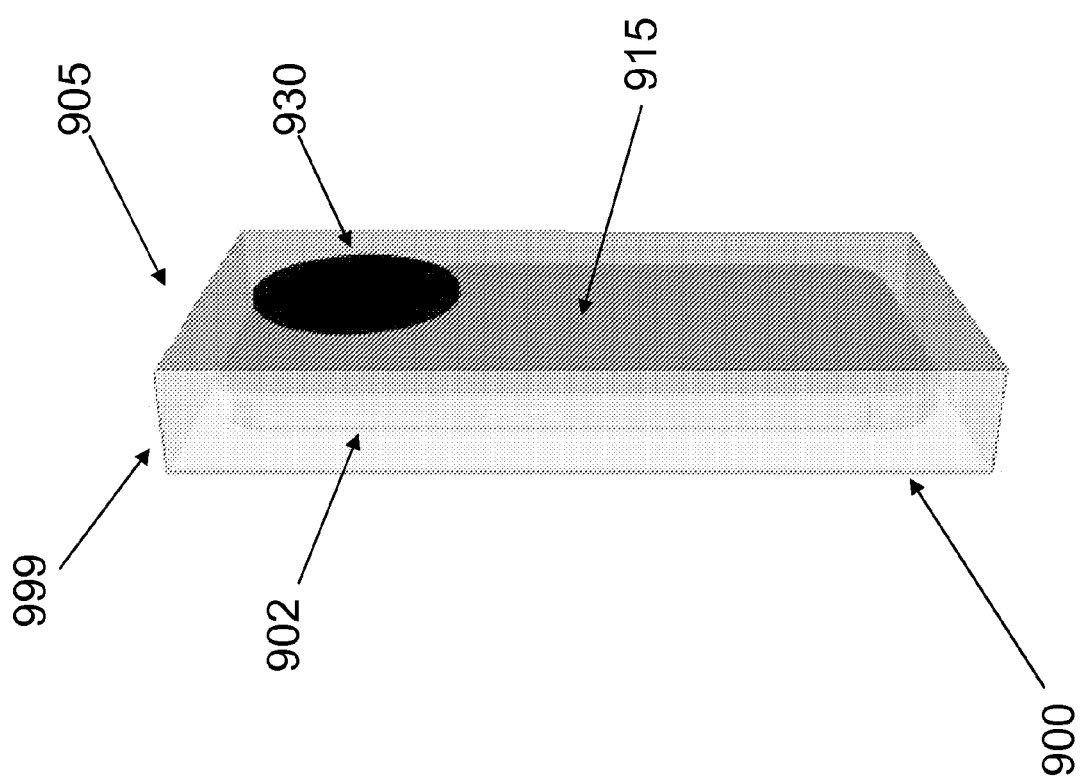

Attention is now turned to FIG. 9 which shows an embodiment of the instant invention in which a touch-sensitive screen protector 900 is integrated into a cellular phone protection device 999. As previously noted, most prior art screen protectors are either very thin to allow continued touch sensitivity or thick and do not allow for access to the touch screen when the screen is protected. The same issues dog cell phone cases: either they do not particularly cover the touch-sensitive screen or they cover it to offer maximum protection, at the expense of allowing use of the screen when the phone is protected (for example, http://reviews.cnet.com/2300-6448_7-10004905-2.html). In FIG. 9, a cell phone 902 is encased in a cellular phone protection device 999. The protection device 999 includes a screen protector 900 that is minimally composed of an impact resistant cover 905 and associated magnets 930 (only the outer magnets 930 resting outside of the cover 905 are visible in this view). Magnets 930 allow for a user (not shown) to access the touch-sensitive screen 915 associated with the cell phone 902 by means previously described. It is understood that the immediate embodiments may be applied to tablet computers and other mobile computing devices and unlike the prior art provide protection and screen access simultaneously.

It is expected that some embodiments of the instant invention may include one or a plurality of physical buttons that pass through a clear plastic covering so as to allow for user access to an on/off button as well as other cellular phone features through the plastic cover. Such buttons are generally placed in a single, fixed position (unlike the mobile magnets described herewith in the invention), and if used underwater, appropriate O-rings are employed to prevent water from reaching the screen through the holes drilled in the plastic cover. Such buttons work on pressure from user and do not involve magnets as described herewith. An example of a prior art fixed physical button arrangement for underwater photography (only) is the following: http://www.techtalkr.com/tat7-scuba-case-underwater-casing-for-iphone/.

Embodiments of the instant invention may be included in other products such as helmets, clothes, autos, tables, military displays, or other objects. Additionally, embodiments of the invention may include microphone, speaker or other electronic elements placed on a case or the like that integrates therewith an embodiment of the instant invention. Alternatively, the element may cover regions beyond a touch-sensitive screen to provide environmental protection for an entire device.

Some embodiments of the invention may also allow for mechanical activation of physical keys, such as those associated with a QWERTY keyboard or the like.

The protective element may be clear, semi-clear or completely occluded. Additionally, in some embodiments, the protective element may have areas that are clear with other areas occluded.

The protective element in some embodiments may include electrically-conducting materials and/or show electrically conducting properties. In embodiments employing a stylus, the stylus may be replaceable and it may be made of any relevant materials and show any relevant properties to allow for activation of or communication with a touch-screen display.

It is understood that pluralities of magnet pairs may be employed in some embodiments of the invention, and some magnets may be associated with a user, his fingers, and or an associated magnet-impregnated glove.

Some embodiments of the instant invention may also include space to store magnets used in the invention. Magnets associated with the outer side and the inner side of the protective element may be stored together or separately. Some embodiments may include a further protector disposed above the protective element so as to protect the latter from scratches and any other incidental damages.

In some embodiments of the invention, the protective element may include optical or other features to enhance the interaction with the associated touch-screen display. Magnifying capabilities, lenses, or prisms may be employed to aid user in seeing the touch-screen display beneath the protective element. In some embodiments, magnets may be associated with such optical elements such as lenses to aid in the use of said magnets. Fiber optics may be employed to aid in positioning of stylus.

While the instant invention has been described primarily as an "add-on" component for computing devices having touch-sensitive screens and the like, in some embodiments the instant invention may be produced and/or sold with the associated computing element/cellular phone. Legs, spacers, and the like may be employed to keep the protective element at an optimized position relative to an associated screen or display to allow for user-selected activation of the screen.

Some embodiments of the instant invention may allow a user to move the protective element to allow for coverage of some, but not necessarily all regions of a display or the like.

Some embodiments of the instant invention may include holes or other elements to aid in speaking and hearing. Some holes may include options for transient opening and closing.

A single touch-sensitive screen protector may be employed to protect a plurality of displays or alternatively a plurality of screen protectors may be employed to protect a single display.

In some embodiments of the invention, magnets may be attached to cables, fiber optic wires, or the like so as to enhance functionality.

Some embodiments of the instant invention may include a sack or pouch to store the screen protector when not in use.

It is understood that some embodiments of the instant invention may include a plurality of magnet pairs disposed around a protective cover element. Additionally, some embodiments may have magnet pairs in generally fixed positions and not moving over the element surface.

It is expected that during the life of a patent maturing from this application, additional impact-resistant, touch-responsive display cover will be developed, and the scope of the term of the invention is intended to include all such new technologies a priori.

It is understood that the disposition of the magnets as described and shown—three positive and one negative—could easily be reversed to have three negative and one positive relative to the surfaces of the protective element in the invention. Additionally, electromagnets having no polarity may be employed in some embodiments of the instant invention, such electromagnets receiving polarity as a function of a user contacting one or more such magnets.

As used herein the term "about" refers to ±10%.

The terms "comprises", "comprising", "includes", "including", "having" and their conjugates mean "including but not limited to".

The term "consisting of means "including and limited to".

The term "consisting essentially of means that the, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. The present invention could be employed for a wide variety of embodiments with differentially sized flotation elements as herewith described. The instant invention may be employed in dosing of other medications not directly described herewith.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements. Certain embodiments of the instant invention may include design features that allow for easy finger contact and movement of the magnets/stylus over the surface of the protective element.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed:

1. A method for protecting a touch-screen display from physical damage, including:

providing an optically clear solid element whose dimensions are dimensions of said display and whose thickness is selected to prevent damage to said display;

disposing magnet pairs on either side of said solid element, wherein said magnet pairs are disposed opposite one another and wherein physical contact with one magnet of a first magnet pair causes magnetic repulsion of a first magnet opposite the one magnet in a second magnet pair on the other side of said solid element;

associating a stylus to said first magnet of the second magnet pair, wherein said stylus is disposed away from said solid element; and securing said solid element with said magnets and stylus onto said display, wherein said stylus is in non-contact proximity to said display.

2. The method according to claim 1, further comprising a step of physically touching said one magnet of said first magnet pair, thus causing said stylus associated with said second magnet pair to be depressed for contact with said display.

3. The method according to claim 1, further comprising a step of coating an anti-friction on the surfaces of said element.

4. The method according to claim 1, wherein further comprising a step of removing the solid element for access of said display

* * * * *